United States Patent
Bailey et al.

(10) Patent No.: US 9,002,817 B2
(45) Date of Patent: Apr. 7, 2015

(54) INTERLEAVING SEARCH RESULTS

(71) Applicant: Google Inc., Mountain View, CA (US)

(72) Inventors: David R. Bailey, Paolo Alto, CA (US);
Johnathan J. Effrat, Mountain View, CA (US); Amit Singhal, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/279,763

(22) Filed: May 16, 2014

(65) Prior Publication Data

US 2014/0365458 A1    Dec. 11, 2014

Related U.S. Application Data

(60) Continuation of application No. 13/327,708, filed on Dec. 15, 2011, now Pat. No. 8,738,597, which is a division of application No. 11/952,078, filed on Dec. 6, 2007, now Pat. No. 8,086,600.

(60) Provisional application No. 60/869,100, filed on Dec. 7, 2006.

(51) Int. Cl.
*G06F 17/30* (2006.01)

(52) U.S. Cl.
CPC ...... *G06F 17/30864* (2013.01); *G06F 17/3053* (2013.01)

(58) Field of Classification Search
CPC ........................................................ G06F 17/30
USPC ................................................. 707/600–899
See application file for complete search history.

(56) References Cited

U.S. PATENT DOCUMENTS

2006/0018551 A1 *   1/2006   Patterson ..................... 382/229

* cited by examiner

*Primary Examiner* — Isaac M Woo
(74) *Attorney, Agent, or Firm* — Fish & Richardson P.C.

(57) ABSTRACT

Methods, systems, and computer program products are provided for interleaving search results. A method includes presenting multiple first search results received from a first search engine. The first search results satisfy a search query directed to the first search engine and are presented in an order. A second search result from a second search engine is inserted at a position between two otherwise adjacent first search results. The second search result is received from a second search engine in response to the search query.

20 Claims, 5 Drawing Sheets

Michael Richards (I) }330
Michael Richards (I) on IMDb: Movies, TV, Celebs, and more....
www.imdb.com/name/nm0724245/- 42k - Cached - Similar pages

Michael Richards - Wikipedia, the free encyclopedia }330
Michael Richards at the 44th Emmy Awards, August,1992, photo by Alan Light ... For other people named Michael Richards, see Michael Richards ...
en.wikipedia.org/wiki/Michael_Richards - 49k - Cached - Similar pages

"Kramer's" Racist Tirade -- Caught on Tape - TMZ.com }330
Michael Richards exploded in anger as he performed at a famous L.A. comedy club last Friday, hurling racial epithets that left the crowd gasping, ...
www.tmz.com/2006/11/20/kramers-racist-tirade-caught-on-tape/ - 67k - Nov 30, 2006 - Cached - Similar pages

Seinfeld star Michael Richards to meet with offended black comedy ... }320
LOS ANGELES: "Seinfeld" star Michael Richards will apologize in person to the four black patrons he targeted in a tirade of racial slurs during a recent ...
www.iht.com/articles/ap/2006/12/01/arts/NA_A-E_CEL_US_Michael_Richards.php - 3k - Dec 1, 2006 ~310

The New York Times: Search for 'michael richards' }330
Michael Richards Apology Comedian finally gives apology for racial comments ... Michael Richards Michael Richards Spews Racist Slurs Get the Latest News on ...
query.nytimes.com/search/query?se&query=michael%20richards - 48k - Cached - Similar pages

FIG. 3

All Outdoors 09/29/95
Today, anglers ply the Cuivre (pronounced "quiver") River in pursuit of catfish, carp, ... East of Troy on Highway 147, Cuivre River State Park not only has ...
www.mdc.mo.gov/news/out/1995/out09295.html - 22k - Cached - Similar pages } 420

Learning about nature is fun
The day at the state park was a fieldtrip to reinforce environmental ... State Park; Meramec State Park; Onondaga State Park; Quiver River State Park; ...
www.openspacecouncilstl.org/UPOP2.htm - 14k - Cached - Similar pages } 420

Hiking Missouri - Google Books Result
by Kevin M. Lohraff - 1999 - 216 pages
Area Information If Cuivre (pronounced "quiver") River State Park were in south Missouri, no one would question its rugged, wooded hills, deep valleys, ...
books.google.com/books?isbn=0880118938... } 410

450  430  440

Hunting & Trapping on State Parks- Guide to Hunting & Trapping in ...
Patapsco Valley State Park- See Carroll County Patuxent River State Park- Forest game, upland game, deer (bow, muzzleloader and shotgun). ...
www.dnr.state.md.us/huntersguide/sfppublichunting.asp - 16k - Cached - Similar pages } 420

GatewayToScience
Katy Trail State Park is built on the former corridor of the ... Cuivre (pronounced "quiver") River is one of Missouri"s largest state parks. ...
gatewaytoscience.org/directory/stcharles.htm - 25k - Cached - Similar pages } 420

FIG. 4

Michael Richards (I)
Michael Richards (I) on IMDb: Movies, TV, Celebs, and more...
www.imdb.com/name/nm0724245/ - 42k - <u>Cached</u> - <u>Similar pages</u>  } 540

Michael Richards - Wikipedia, the free encyclopedia
Michael Richards at the 44th Emmy Awards, August, 1992, photo by Alan Light ... For other people named Michael Richards, see Michael Richards ...
en.wikipedia.org/wiki/Michael_Richards - 49k - <u>Cached</u> - <u>Similar pages</u>  } 540

"Kramer's" Racist Tirade -- Caught on Tape - TMZ.com
Michael Richards exploded in anger as he performed at a famous L.A. comedy club last Friday, hurling racial epithets that left the crowd gasping, ...
www.tmz.com/2006/11/20/kramers-racist-tirade-caught-on-tape/ - 67k - Nov 30, 2006 - <u>Cached</u> - <u>Similar pages</u>

Canada.com
510

Seinfeld star Michael Richards to meet with offended black comedy ...
International Herald Tribune - 10 hours ago
LOS ANGELES: "Seinfeld" star Michael Richards will apologize in person to the four black patrons he targeted in a tirade of racial slurs during a recent ...
Michael Richards' Mea Culpa Mediation E! Online
Michael Richards San Francisco Chronicle
Richards to Make Face-to-Face Apology to Heckler FOX News
Canada.com
<u>all 309 news articles »</u>  } 520 } 530

The New York Times: Search for 'michael richards'
Michael Richards Apology Comedian finally gives apology for racial comments. ... Michael Richards Michael Richards Spews Racist Slurs Get the Latest News on ...
query.nytimes.com/search/query?se&query=michael%20richards - 48k - <u>Cached</u> - <u>Similar pages</u>  } 540

FIG. 5

INTERLEAVING SEARCH RESULTS

CROSS-REFERENCE TO RELATED APPLICATION

This application is a continuation of, and claims priority to, pending U.S. patent application Ser. No. 13/327,708, filed on Dec. 15, 2011, which is a divisional application of, and claims priority to U.S. patent application Ser. No. 11/952,078, filed on Dec. 6, 2007, which claims the benefit under 35 U.S.C. §119(e) of the priority date of U.S. Provisional Patent Application No. 60/869,100, filed on Dec. 7, 2006, the entirety of which is herein incorporated by reference.

BACKGROUND

This specification relates to the presentation of search results in response to a search request presented by a user to a search service.

A search service, e.g., a web-based search service, will generally receive a search request from a user through a search page presented to the user by the service through a web browser on a personal computing device. In making the search request, the user will generally select a kind of resource to be searched—e.g., generic web pages, images, news, and so on—and in the absence of an explicit selection, a default selection, typically generic web pages, will be used. Generic web pages are uncategorized web pages, as opposed to, for example, news resources which are web pages categorized as a news resource. Some search services will present different search pages as user interfaces to receive search requests directed to searching different kinds of resources.

Upon receiving a search query, a search service will generally direct the search query to a search engine for a specific corpus of resources. A search engine is associated with a kind of resource, and will produce search results based on the query and on the kind of resource it is associated with. It ranks the search results based on their relevance to a query in the context of the corpus to which the query was directed.

Examples of corpora that search engines may search or be associated with include generic web pages, news, images, books, and videos.

A search engine that searches generic web pages produces web page search results. Each generic web page search result may contain one or more of the following attributes: a title of a web page, a hyperlink to the web page, a snippet of text showing search terms in bold, the size of the web page, a hyperlink to similar web pages, and a hyperlink to a cached version of the web page.

A search engine that searches news produces news search results. Each news search result may contain one or more of the following attributes: a title of the news resource, a hyperlink to the news resource, a snippet of text showing search terms in bold, the publication date and time of the news resource, an image, and links to similar news resources.

A search engine that searches images produces image search results. Each image search result may contain one or more of the following attributes: an image, a short description of the image, the size of the image, the resolution of the image, the image type, the source of the image, and a hyperlink to the source of the image.

A search engine that searches books produces book search results. In some implementations, what is searched are scanned copies of books, that is, the corpus includes text from scanned and parsed physical books, which is referenced from the book search results. Each book search result may contain one or more of the following attributes: a title of the book, a hyperlink to the book, an image, a hyperlink to a table of contents, a hyperlink to a first page of the book, an author, a publication date, and a hyperlink to an index of the book.

A search engine that searches videos produces video search results. Each video search result may contain one or more of the following attributes: a title of the video, a hyperlink to the video, an image, a rating for the video, the number of ratings made for the video, the publication date, a short description of the video, and the source of the video.

After the search engine produces the search results, the search service presents those results to the user. The format that the search service presents the results in typically varies according to the attributes of the search results. For example, the format of news search results typically differ from the format of generic web page search results.

When a user elects to search generic web pages, the search service may evaluate the user's search request to determine whether or not a news search result would likely be relevant to the user's request. If it would be relevant, the search service may use one search engine to search generic web pages, and use a different search engine to search news. Using the results produced by the two search engines, the search service presents to the user a news search result, followed by the generic web page search results.

SUMMARY

This specification describes technologies relating to presenting results for a search query that derive from different search engines or bodies of searched resources.

In general, one aspect of the subject matter described in this specification can be embodied in methods that include the actions of presenting a plurality of first search results received from a first search engine, the first search results satisfying a search query directed to the first search engine, the first search results being presented in an order; and presenting a second search result inserted at a position between two otherwise adjacent first search results in the order, the second search result being received from a second search engine in response to the search query, the first search engine searching a first corpus of first resources, the second search engine searching a second corpus of second resources, the first search engine and the second search engines being distinct from each other. Other embodiments of this aspect include corresponding systems, apparatus, and computer program products.

In general, another aspect of the subject matter described in this specification can be embodied in methods that include the actions of presenting a plurality of first search results received from a first search engine, the first search results satisfying a search query directed to a corpus of first resources, the first search results being presented in an order; and presenting a first group of two or more second search results inserted at a position between two otherwise adjacent first search results in the order, the second search results being received from a distinct second search engine. Other embodiments of this aspect include corresponding systems, apparatus, and computer program products.

In general, another aspect of the subject matter described in this specification can be embodied in methods that include the actions of receiving a plurality of first search results from the first search engine, in response to a search query directed to a first search engine and not to a distinct second search engine, each of the plurality of first search results having a respective first score; applying the search query to receive a second search result from a second search engine, the second search result having a second score; and determining from the second score whether to present the second search result, and if so, presenting the first search results in an order according to their respective scores, and presenting the second search result at a position relative to the order, the position being determined using the first scores and the second score. Other embodiments of this aspect include corresponding systems, apparatus, and computer program products.

In general, another aspect of the subject matter described in this specification can be embodied in methods that include the actions of receiving a plurality of first search results from the first search engine in response to a search query directed to a first search engine and not to a distinct second search engine, each of the plurality of first search results having a respective first score; applying the search query to receive a second search result from the second search engine, the second search result having a second score; and presenting the first search results in an order according to their respective first scores, with the second search result at a position relative to the order, the position being determined using the first scores and the second score. Other embodiments of this aspect include corresponding systems, apparatus, and computer program products.

In general, another aspect of the subject matter described in this specification can be embodied in a system that includes a search service implemented on a data processing platform comprising one or more computers. The service is operable to respond to a search request for generic web pages with a plurality of first web page search results, each of the first web page search results presented in a web page results format; respond to a search request for news with a plurality of first news search results, each of the first news search results presented in a news results format; and respond to a search request for web pages with a plurality of second web page search results and a second news search result inserted among the second web page search results. Other embodiments of this aspect include corresponding methods, apparatus, and computer program products.

Particular embodiments of the subject matter described in this specification can be implemented to realize one or more of the following advantages. News results can be returned as a result to a search of web pages based on the rank scoring of the news results without a need for the search request to be recognized as one for which news would likely be relevant.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
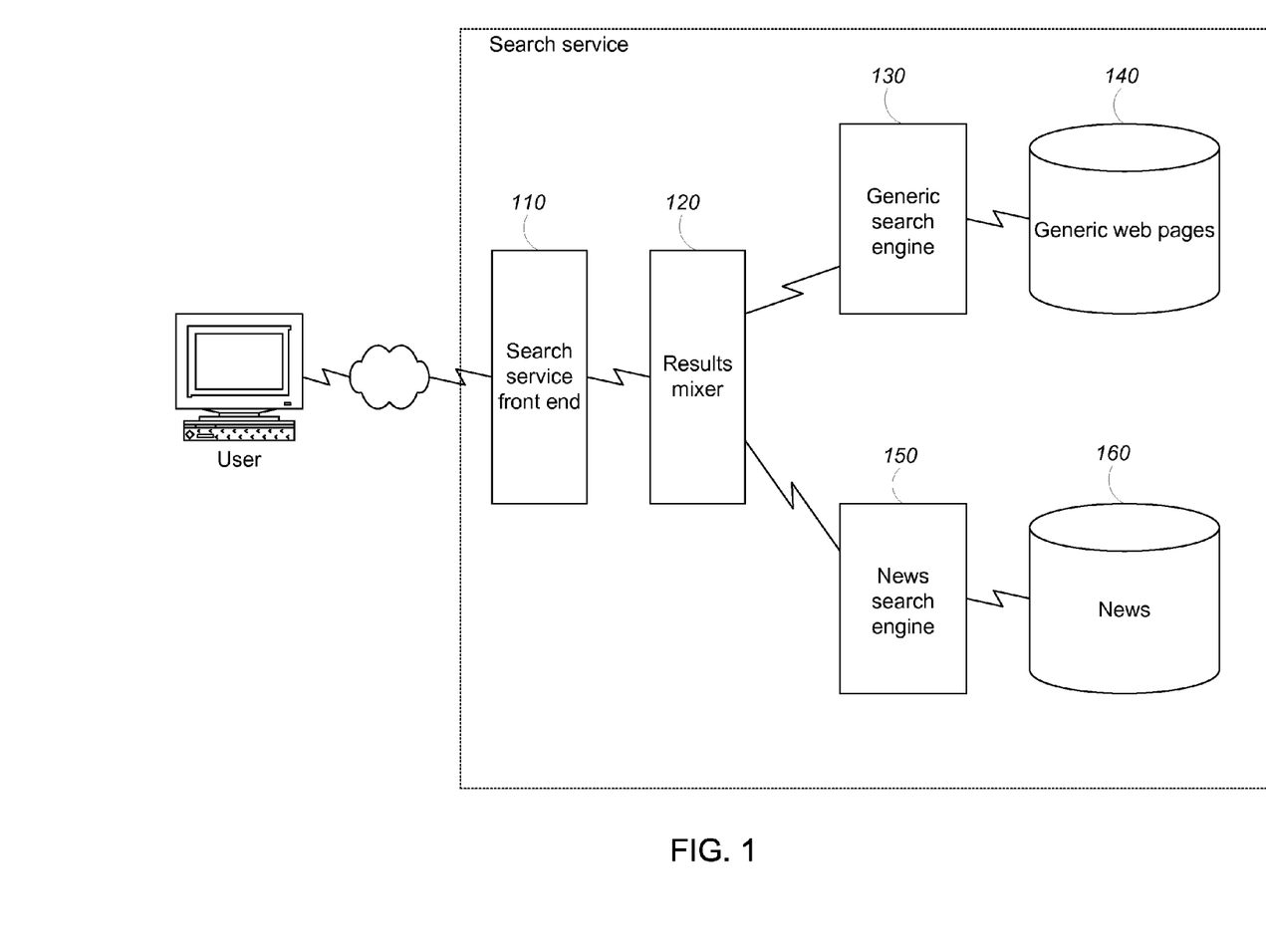
FIG. 1 illustrates an example of a search service.

FIG. 1 illustrates an example search service that has a search service front-end 110, a results mixer 120, a generic search engine 130 for searching generic web pages 140, and a news search engine 150 for searching news 160.

Figure 2:
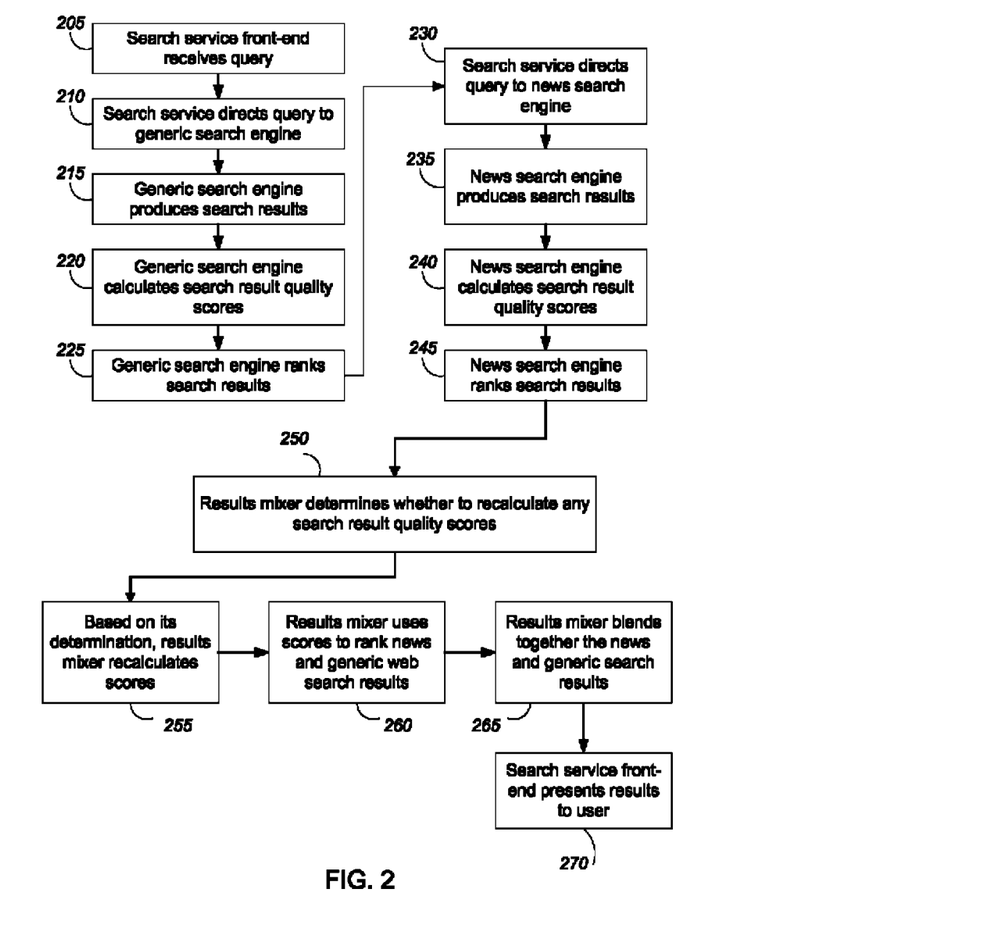
FIG. 2 is a flowchart illustrating operation and use of the example service.

FIG. 2 is a flowchart illustrating operation and use of the example service.

The search service front-end receives the user's query (step 205). In some implementations, it also receives user metadata, e.g., a search history profile of the user.

The search service directs the user's query to the generic search engine (step 210). The generic search engine performs the search and produces generic web page search results (step 215).

The generic search engine calculates a search result quality score for each of its search results (step 220). It ultimately uses the search result quality scores to rank the search results. In some implementations, a results mixer, rather than the generic search engine, calculates the search result quality scores.

The search result quality score is based on multiple distinct scoring features. The scoring features are used to determine parameter values for a scoring calculation. Scoring features can include, for example, features based on attributes of the resources in question, features based on historical data describing access to or use of the resources, or both. For some of the scoring features, the search result will have a pre-calculated score. For the other scoring features, the generic search engine will dynamically calculate a score based on the search result, the user's query, and any associated metadata from the search service front-end. In the general case, the generic search engine will use pre-calculated scores for some of the scoring features, and it will calculate a score for other features based on the query and on other user metadata.

The generic search engine adds all the scores associated with the distinct scoring features. The sum is the search result quality score for a particular search result. In some implementations, the results mixer adds the scores together. In other implementations, the scores are multiplied together, rather than added together.

Using the search result quality scores, the generic search engine ranks the generic web page search results (step 225). In some implementations, the results mixer ranks the generic web page search results.

The search service also directs the query to the news search engine (step 230). The news search engine performs the search and produces one or more news search results (step 235).

The news search engine calculates a search result quality score for each of its search results (step 240). It ultimately uses the search result quality scores to rank the news search results. In some implementations, the results mixer, rather than the generic search engine, calculates the search result quality scores.

The search result quality score is based on multiple distinct scoring features, as described above for the generic search engine. However, some of the scoring features used by the news search engine are unique, i.e., they are distinct from any scoring feature that the generic search engine uses, e.g., news freshness. Similarly, some of the scoring features used by the generic search engine are unique with reference to the news search engine. In alternative implementations, the scoring features differ not because they are unique, but because their significance in the calculation of the search result quality score is different in the different search engines.

As is the case with the generic search engine, the scores associated with some of the scoring features of the news search results are pre-calculated, while the other scores are dynamically calculated by the news search engine.

The news search engine adds all the scores associated with the distinct scoring features. The sum is the search result quality score for a particular search result. In some implementations, the results mixer adds the scores together. In other implementations, the scores are multiplied together, rather than added together.

Using the search result quality scores, the news search engine ranks the news search results (step 245). In some implementations, the results mixer ranks the news search results.

The results mixer blends together the news and generic web page search results so that composite search results can be presented in response to the search query. This increases the diversity of search results presented to the user.

Using the ranked generic web page search results, and the ranked news search results, the results mixer determines whether to recalculate the search result quality scores of any of the search results (step 250). It only recalculates scores when more than one search result from a given search engine is available. For example, it may determine to recalculate the search result quality scores of all generic web page search results ranked lower than second place. To recalculate the search result quality scores, the results mixer will decrease the scores that were based on unique scoring features (a reduction in the contribution of the unique scoring features leads to a reduction in the overall score). For example, if the results mixer decided to recalculate the search result quality scores of the second and third highest-scoring generic web page search results, it could do so by decreasing the contribution of the unique scoring features by 10% and 20%, respectively.

Based on its determination, the results mixer recalculates the search result quality scores (step 255).

The results mixer then uses the recalculated search result quality scores to rank the news and generic web page search results in a single ranking (step 260).

Based on the new rankings, the results mixer blends the search results together (step 265) by inserting one or more news search results at a position among the generic web page search results. For example, the results mixer may insert at least one news search result at any of various positions within a list of ten generic web page search results. In some implementations, the results mixer only inserts the highest ranked news search result among the generic web page search results. In other implementations, the results mixer may determine not to insert any news search result among the generic web page search results because none of the news search results have a high enough rank. In other implementations, the news search engine gives grouped news search results to the results mixer, and the results mixer uses the rankings to insert a group at a position among the generic web page search results. Alternatively, the group may be inserted at a fixed position, e.g., at the top, bottom, or center of a list of generic web page search results.

Optionally, the results mixer imposes limitations to where the news search results may be inserted. For example, a news search result may be limited to positions in the order corresponding to either the third ranked result or a lesser ranked result. Or, for example, a news search result may be limited to a position in the order that is more than two (or some other number) of positions away from another news search result.

The search service front-end presents the blended results to the user (step 270). The order of the ranking represents the order that the results will be presented in.

Figure 3:
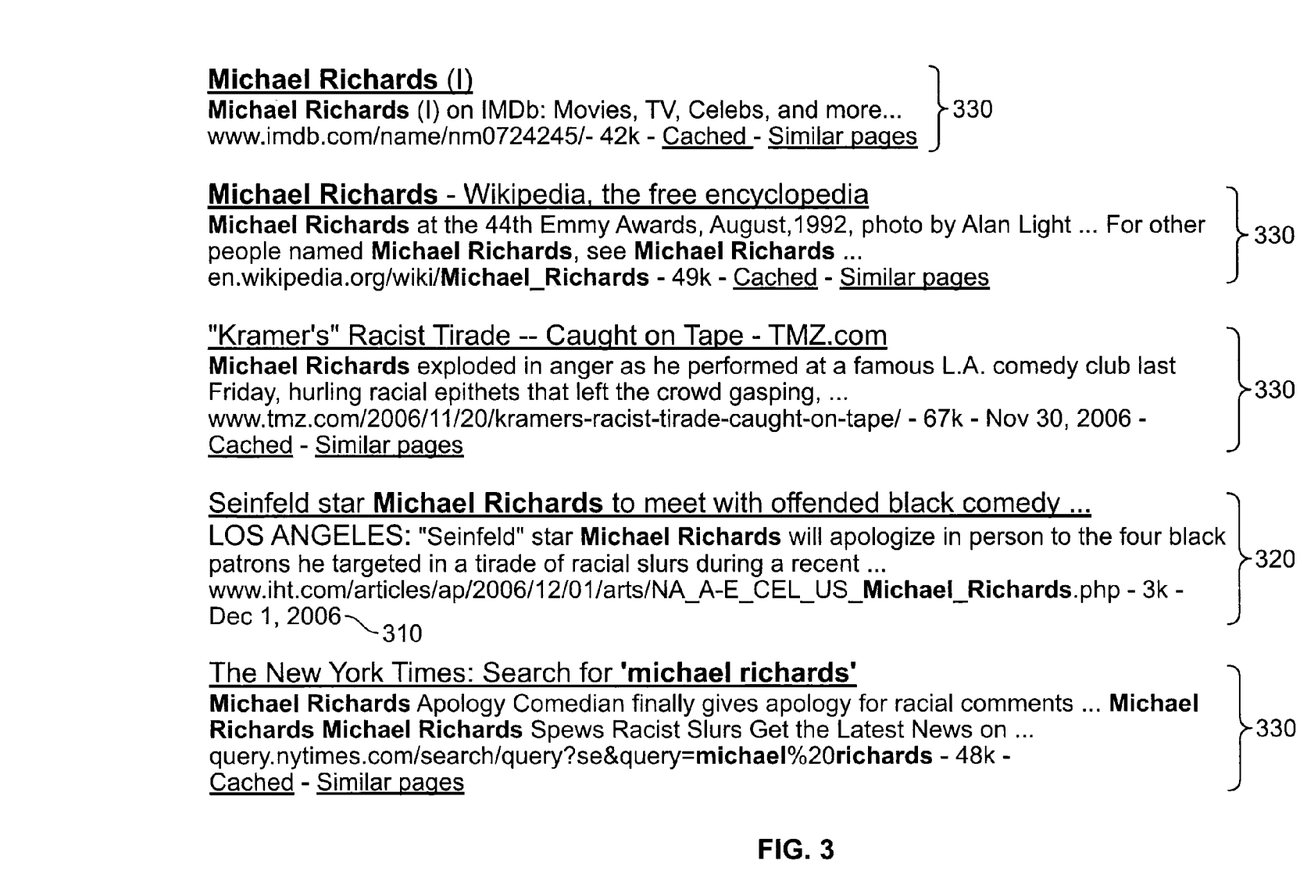
FIG. 3 is a screenshot of a news search result inserted among generic web search results.

As shown in FIG. 3, the search service front-end can use different presentation formats for the news and generic web page search results. For example, in some implementations, the search service front-end always presents a publication date 310 for a news search result 320, but only occasionally or not at all for a generic web page search result 330.

Figure 4:
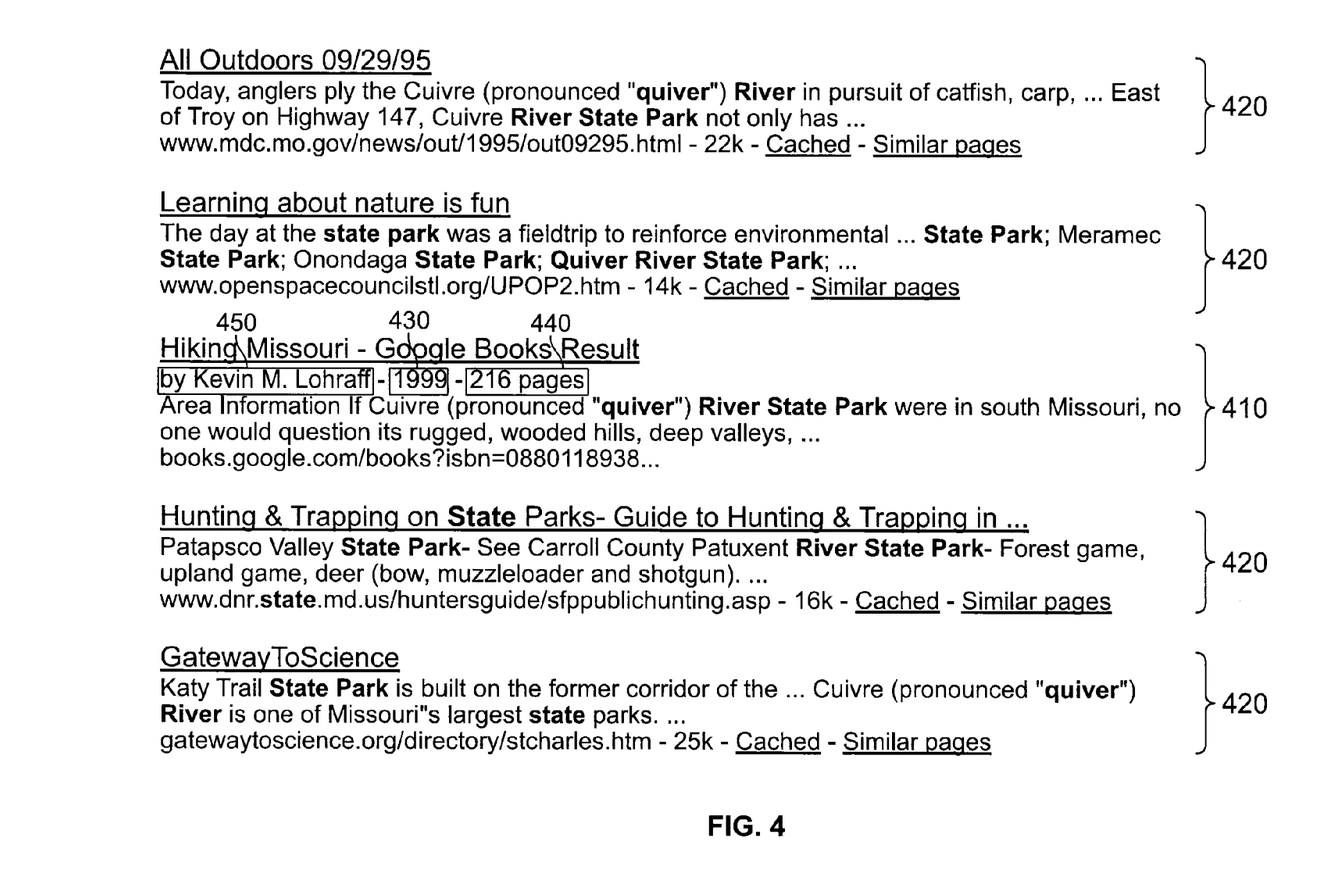
FIG. 4 shows a book search result inserted among generic web page search results.

As shown in FIG. 4, in some implementations where a books search result 410 is inserted among generic web page search results 420, the search service front-end presents the publication date 430, number of pages 440, and the author of a book 450.

Figure 5:
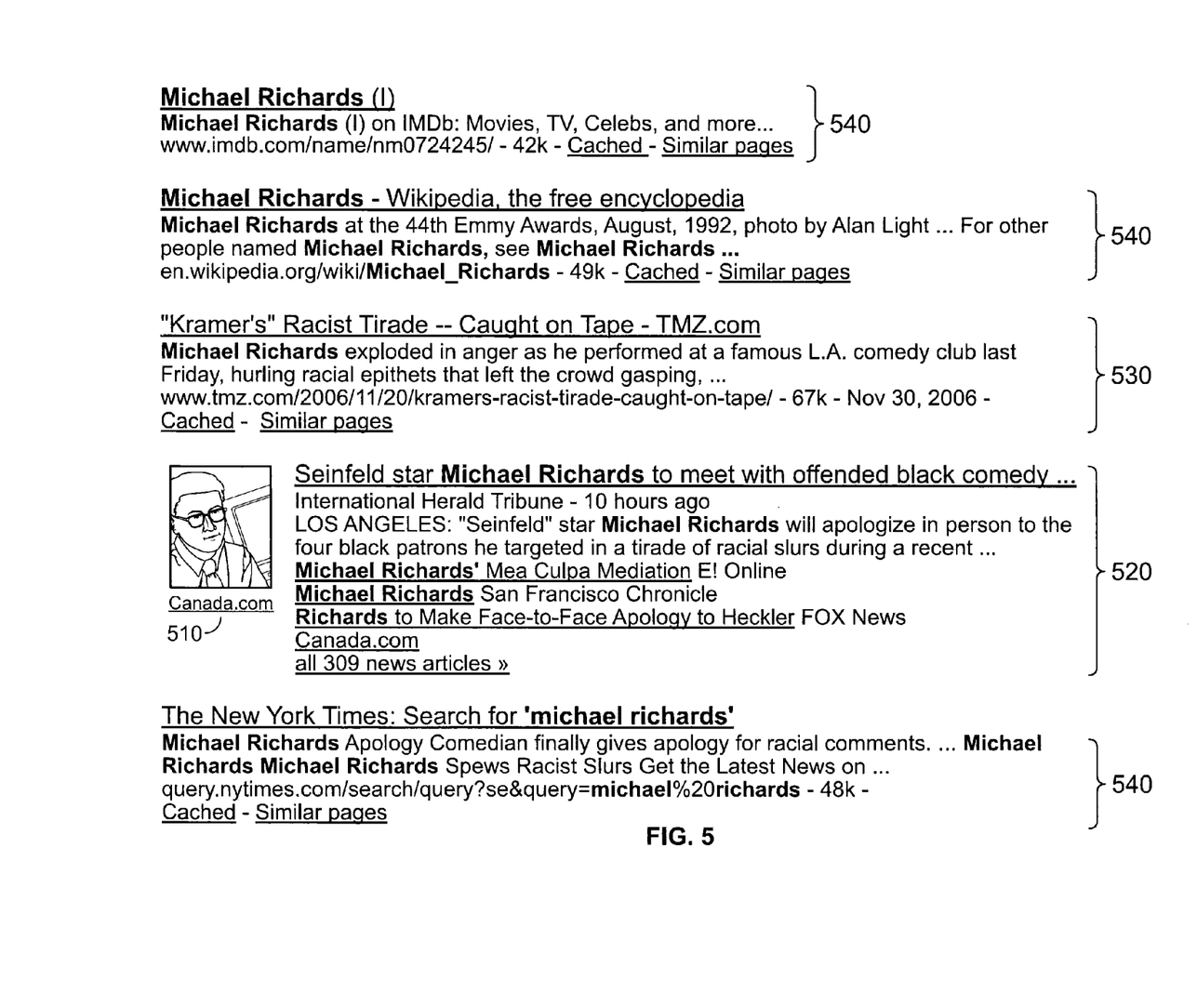
FIG. 5 is a screenshot of a news search result inserted among generic web search results.

In implementations where search results are grouped together, the search service front-end presents user interface elements particular to the group. For example, as shown in FIG. 5, the search service front-end may present an image 510 adjacent to a group 520 of news search results, where the group 520 of news search results is inserted among generic web page search results 540. In some implementations, as shown in FIG. 5, a news search result 530 may be presented adjacent to other news search results.

Some implementations include a conventional user feedback mechanism for a scoring system. The user feedback mechanism uses user-click-data to learn characteristics of queries, or of results of queries, that correlate with high-quality clicks. For example, the mechanism might learn that queries that begin with "how to . . . " often lead to clicks on book search results. In that case, the mechanism recognizes that book search results are preferred for future queries that begin with "how to . . . " and causes such results to have an enhanced search result quality score.

In some implementations, the user feedback mechanism can also provide feedback that is personalized for individual users or clusters of users who have some characteristics in common. For example, a user might be recognized as preferring news search results and so the feedback mechanism causes such results to have an enhanced search result quality score.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Also, other search engines may be used instead of a news search engine for searching news. Examples include a book search engine for searching books, a video search engine for searching videos, and an image search engine for searching images. Furthermore, other search engines may be used instead of a generic search engine for searching generic web pages. Examples include a book search engine for searching books, a video search engine for searching videos, an image search engine for searching images, and a news search engine for searching news. More than two search engines may be used. For example, in addition to blending results from a news search engine and a generic search engine, one or more of the following kinds of search engines may be used: a book search engine for searching books, a video search engine for searching videos, or an image search engine for searching images; and their results may be blended with each other or with generic web search results or both. Accordingly, other embodiments are within the scope of the following claims.

The invention claimed is:

1. A computer-implemented method comprising:
    receiving in a search engine system a query, the query comprising query text submitted by a user;
    searching a first collection of resources to obtain one or more first search results, wherein each of the one or more first search results has a respective first search result score;
    searching a second collection of web resources to obtain one or more second search results, wherein each of the one or more second search results has a respective second search result score, wherein the resources of the first collection of resources are different from the resources of the second collection of web resources;
    determining from historical user click data that resources from the first collection of resources are more likely to be selected by users than resources from other collections of data when presented by the search engine in a response to the query text;
    generating enhanced first search result scores for the first search results as a consequence of the determining, the enhanced first search result scores being greater than the respective first search result scores for the first search results;
    generating a presentation order of first search results and second search results in order of the enhanced first search result scores and the second search result scores;
    generating a presentation of highest-ranked first search results and second search results in the presentation order; and
    providing the presentation in a response to the query.

2. The method of claim 1, wherein the historical click data represents resource collections of search results selected by users after submitting the query.

3. The method of claim 1, wherein determining from historical user click data that resources from the first collection of resources are more likely to be selected by users than resources from other collections of data when presented by the search engine in a response to the query text comprises:
    obtaining one or more user characteristics of the user; and
    determining that users having the one or more user characteristics are more likely to select resources from the first collection of resources than resources from other collections of data.

4. The method of claim 1, wherein generating the presentation of highest-ranked first search results and second search results in the presentation order comprises generating the presentation so that at least one first search result occurs within a number of highest-ranked second search results.

5. The method of claim 1, wherein generating the presentation of highest-ranked first search results and second search results in the presentation order comprises:
    generating each of the second search results in a web search results presentation format; and;
    generating each of the first search results in a different presentation format.

6. The method of claim 5, wherein the first search results identify news resources.

7. The method of claim 1, wherein generating the presentation of highest-ranked first search results and second search results in the presentation order comprises generating the presentation including two or more of the first search results in a group among one or more second search results.

8. The method of claim 1, further comprising computing one or more modified second scores of second search results including decreasing a contribution of a scoring feature unique to resources of the second search results.

9. The method of claim 1, wherein each respective first score for the first search results is based on a publication date of a resource corresponding to the first search result.

10. A system comprising:
    one or more computers and one or more storage devices storing instructions that are operable, when executed by the one or more computers, to cause the one or more computers to perform operations comprising:
    receiving in a search engine system a query, the query comprising query text submitted by a user;
    searching a first collection of resources to obtain one or more first search results, wherein each of the one or more first search results has a respective first search result score;
    searching a second collection of web resources to obtain one or more second search results, wherein each of the one or more second search results has a respective second search result score, wherein the resources of the first collection of resources are different from the resources of the second collection of web resources;
    determining from historical user click data that resources from the first collection of resources are more likely to be selected by users than resources from other collections of data when presented by the search engine in a response to the query text;
    generating enhanced first search result scores for the first search results as a consequence of the determining, the enhanced first search result scores being greater than the respective first search result scores for the first search results;
    generating a presentation order of first search results and second search results in order of the enhanced first search result scores and the second search result scores;
    generating a presentation of highest-ranked first search results and second search results in the presentation order; and
    providing the presentation in a response to the query.

11. The system of claim 10, wherein the historical click data represents resource collections of search results selected by users after submitting the query.

12. The system of claim 10, wherein determining from historical user click data that resources from the first collection of resources are more likely to be selected by users than resources from other collections of data when presented by the search engine in a response to the query text comprises:
    obtaining one or more user characteristics of the user; and
    determining that users having the one or more user characteristics are more likely to select resources from the first collection of resources than resources from other collections of data.

13. The system of claim 10, wherein generating the presentation of highest-ranked first search results and second search results in the presentation order comprises generating the presentation so that at least one first search result occurs within a number of highest-ranked second search results.

14. The system of claim 10, wherein generating the presentation of highest-ranked first search results and second search results in the presentation order comprises:
    generating each of the second search results in a web search results presentation format; and;
    generating each of the first search results in a different presentation format.

15. The system of claim 14, wherein the first search results identify news resources.

16. The system of claim 10, wherein generating the presentation of highest-ranked first search results and second search results in the presentation order comprises generating the presentation including two or more of the first search results in a group among one or more second search results.

17. The system of claim 10, further comprising computing one or more modified second scores of second search results including decreasing a contribution of a scoring feature unique to resources of the second search results.

18. The system of claim 10, wherein each respective first score for the first search results is based on a publication date of a resource corresponding to the first search result.

19. A computer program product, encoded on one or more non-transitory computer storage media, comprising instructions that when executed by one or more computers cause the one or more computers to perform operations comprising:

receiving in a search engine system a query, the query comprising query text submitted by a user;

searching a first collection of resources to obtain one or more first search results, wherein each of the one or more first search results has a respective first search result score;

searching a second collection of web resources to obtain one or more second search results, wherein each of the one or more second search results has a respective second search result score, wherein the resources of the first collection of resources are different from the resources of the second collection of web resources;

determining from historical user click data that resources from the first collection of resources are more likely to be selected by users than resources from other collections of data when presented by the search engine in a response to the query text;

generating enhanced first search result scores for the first search results as a consequence of the determining, the enhanced first search result scores being greater than the respective first search result scores for the first search results;

generating a presentation order of first search results and second search results in order of the enhanced first search result scores and the second search result scores;

generating a presentation of highest-ranked first search results and second search results in the presentation order; and providing the presentation in a response to the query.

20. The computer program product of claim 19, wherein the historical click data represents resource collections of search results selected by users after submitting the query.

* * * * *